United States Patent [19]
Inglett

[11] Patent Number: 5,905,990
[45] Date of Patent: May 18, 1999

[54] FILE SYSTEM VIEWPATH MECHANISM

[75] Inventor: Scott D. Inglett, Rochester, Minn.

[73] Assignee: International Business Machines Corporation, Armonk, N.Y.

[21] Appl. No.: 08/880,781

[22] Filed: Jun. 23, 1997

[51] Int. Cl.[6] .................................................. G06F 17/00
[52] U.S. Cl. ......................... 707/200; 707/203; 707/205
[58] Field of Search ................................. 84/602; 707/1, 707/8, 101, 102, 200, 203, 205, 602, 206, 2

[56] References Cited

U.S. PATENT DOCUMENTS

| | | | |
|---|---|---|---|
| 4,945,475 | 7/1990 | Bruffey et al. ............................... | 707/1 |
| 5,276,874 | 1/1994 | Thomson ................................. | 707/102 |
| 5,313,646 | 5/1994 | Hendricks et al. ...................... | 707/101 |
| 5,355,497 | 10/1994 | Cohen-Levy ............................ | 707/200 |
| 5,544,360 | 8/1996 | Lewak et al. ............................... | 707/1 |
| 5,566,328 | 10/1996 | Eastep ..................................... | 707/102 |
| 5,590,320 | 12/1996 | Maxey .................................... | 707/203 |
| 5,603,019 | 2/1997 | Kish ....................................... | 707/205 |
| 5,611,049 | 3/1997 | Pitts ......................................... | 707/8 |
| 5,633,472 | 5/1997 | DeWitt et al. ............................ | 84/602 |
| 5,678,046 | 10/1997 | Cahill et al. ............................ | 707/200 |
| 5,706,510 | 1/1998 | Burgoon ................................. | 707/203 |
| 5,758,334 | 5/1998 | Knight, III et al. ...................... | 707/2 |

OTHER PUBLICATIONS

David Hendricks—Sun Microsystems, Inc., "A Filesystem for Software Development", USENIX Summer Conference, Jun. 11–15, 1990, pp. 333–340.

Primary Examiner—Wayne Amsbury
Assistant Examiner—Thuy Pardo
Attorney, Agent, or Firm—Jack V. Musgrove; Andrew J. Dillon

[57] ABSTRACT

A computer file system, particularly adapted to UNIX operating systems, for transparently allowing access to and modification of snapshot objects, i.e., files, directories, and symbolic links. The file system creates a mountpoint directory and dynamically searches the computer system to find a requested file object, manifesting a representation of the requested file object in the mountpoint directory if it is found. If an earlier representation of the requested file object already exists (in the mountpoint directory), then any further requests for the file object are directed to the earlier representation. Searching can be performed along a viewpath having two or more independent search paths, including those based on an object name, or based on an object name extension. The binding file translation is done entirely within the kernel to speed up processing, as well as minimize the overhead required to establish mountpoints across different machines.

24 Claims, 5 Drawing Sheets

FILE SYSTEM VIEWPATH MECHANISM

BACKGROUND OF THE INVENTION

1. Field of the Invention

The present invention generally relates to computer systems, and more particularly to a method of displaying information associated with computer file systems, such as directories, files, and symbolic links.

2. Description of the Related Art

To an end user, most computer systems have the same general structure for storing and accessing data, that is, by placing the data in "files" whose names have a particular format, and placing files in "folders" or "directories" to further organize them. These file objects are physically encoded into the machine's storage device, e.g., hard disk. Computer operating systems such as UNIX or MS-DOS use this type of a filing system ("UNIX" is a trademark of UNIX System Laboratories; MS-DOS is a trademark of Microsoft Corp.). In these systems, each file has a unique path name which identifies its location within the file structure. UNIX and MSDOS computers have a "root" directory from which all other directories or sub-directories branch out; in a UNIX operating system, the root directory is designated by the forward slash symbol ("/"), which is also used to separate parts of the path name. For example, the path name "/pdir/sdir/myfile" refers to a file named "myfile" that is located in the "sdir" subdirectory, which is, in turn, located in the primary directory "pdir" at the root level.

Processes interact with the file system using a specific set of commands, such as "open," "read," "copy," etc. For example, the command line "copy \user\oldfile\system\newfile" instructs the operating system to create a duplicate of the file named "oldfile" in the "user" directory, name the duplicate copy "newfile," and place it in the "system" directory. Such interaction can extend between cooperating computer systems, i.e., two or more UNIX machines that are interconnected. These distributed systems provide different types of access to remote computers based on the particular system architecture. In a fully "transparent" distributed system, standard path names are used to refer to files on other machines, as the operating system recognizes that they are remote. In other words, users on one machine can access files on another machine without realizing that they cross a machine boundary. This configuration is convenient for users who commonly share files, whether program or data files. Files can also be shared among users using a single machine whose physical storage device has been partitioned into two or more sections that are specifically assigned to each user when the system is mounted (so there are multiple root directories, one for each user).

Typically a software product comes in many versions. It might evolve over time, adding new features or improving performance, etc. Each new version is typically built from different versions of the same source code, header files, etc. The file system objects utilized to build a given version of software will herein be referred to as "snapshots," given that collectively they are used to build one of many possible versions of a software product. At the user level, four basic schemes have traditionally been employed to make snapshots visible to tools: (a) those that populate tool working directories with snapshot copies prior to tool invocation, (b) those that prepopulate tool working directories with symbolic links pointing to snapshots, (c) those that feed snapshot pathnames to tools at tool invocation time, and (d) those that resort to intercepting tool generated system (input/output, or I/O) calls by way of special took-linkable libraries.

Variations of the first schema are impractical if a sizeable number of snapshots must be made visible, due to time constraints and storage capacity (disk space,) and due to the necessity of recopying objects each time the tool is invoked. If a build took (e.g. UNIX make) is using "dependency" checking to ensure that all source files are up to date, the timestamps must be retained on copies which is easily overlooked and can result in unnecessary rebuilding. Confusion is also likely to result if copied files are updated. For example, if a build is partially successful, and one or more copied files have been updated in order to correct the error(s) that caused that build to fail, those updated files must be recopied. If the builder makes a mistake, perhaps because it is not cognizant of all files that have in fact been updated, the wrong files may be processed when that partially successful build is restarted.

The obvious virtue of the second schema is that it completely eliminates the time and space problems associated with the aforementioned simple copying schema. The new problem is that if the manifestation of a snapshot is a symbolic link, issuance of every possible modification system call against snapshot manifestations cannot be permitted. With two notable exceptions, namely remove( ) and rename( ) (in UNIX,) symbolic links do not protect their target objects from arbitrary modification system calls. If given a symbolic link, remove( ) does not remove the object pointed to by that symbolic link, but rather the symbolic link itself. Similarly, rename( ) operates on a passed link rather the object pointed to by that link. But snapshots manifested by way of symbolic links are not necessarily protected from other modification system calls. AI remaining modification system calls ultimately follow links (e.g. creat( ), mkdir( ), mdnod( ), truncate, write( ),) applying the requested operation to the object pointed to by that link, In this case the only way to protect these objects is to deny write access to them, but then tools are not permitted to issue any of the aforementioned system calls against any of the symbolic links that might refer to these objects. System call anomalies are the norm for circumstances of this sort. If a snapshot of "x.o" exists, it is made visible by way of a symbolic link, and is protected in the aforementioned way, a simple command kke "cc-c x.c" will fail because that "x.o" directory before the compile will succeed. If the newly generated "x.o" file to become a member of some snapshoted library made visible by way of a symbolic link, say the library with name "libfoo.a," a simple subsequent command like "ar x.o libfoo.a" will also fail if that snapshot is not writable. The file "libfoo.a" must also be explicitly copied.

Symbolic links have always been troublesome because they are indistinguishable from the objects they point to. A symbolic link that points to a directory is not itself a directory, though it may under certain circumstances appear to be one. Symbolic links cannot be assumed to be, for all intents and purposes, directories or files. Symbolic links masquerading as files or directories may or may not fool tools that expect to operate on files or directories. It depends upon which system calls those tools use, and when they are not fooled, they are likely to be confused, a condition that usually results in abnormal termination.

Given the quirks associated with symbolic links, one might be tempted to simply make use of some variant of the third schema: passing pathnames of snapshots directly to the build tools that manipulate them, rather than referencing them in a roundabout fashion via symbolic links.

If a make-like build took determines that some buildable item is out of date, it either directly or indirectly executes a user supplied build rule to (re)build that item from its dependencies. In general, each such build rule consists of one or more lines of shell commands, each of which when put into execution, invokes some build tool (e.g. compiler, linker, loader) via its shell interface. One such line might for example invoke a C compiler to (re)build an "x.o" object file from a source dependency with name "x.o." The make-like tool maybe modified in such a way that, just prior to executing the build rule containing this compile line, it replaces the dependency basename "x.o" with the complete pathname of the snapshot that should be made manifest as "x.o." Thus when the compiler is involved, it will see the proper snapshoted version of x.o. The make-like took can be further modified so that it scans the entire build rule prior to execution, replacing all dependency basenames with complete snapshot pathnames. In this way, the appropriate snapshots of all dependencies maybe explicitly named in a build rule visible to the tools that must manipulate them, manifested by explicitly feeding the pathnames to the tools that use them.

The foregoing might seem sufficient for making snapshots visible, but it is not. The files that a UNIX tool operates on are often named on the command line used to invoke that took, but not always. Many extremely important exceptions exist. A C compiler might for example read a large number of header files, none of which are explicitly named on the command line responsible for invoking that compiler. Instead it finds the names of these header files in the source text it is asked to compile, embedded within "include" preprocessor statements. In order to find the file associated with a header file name, it searches the set of include file directories specified on the command line via the "-I" flag. In order to make visible the appropriate snapshoted versions of these header files, the make-like tool must therefore not only expand dependency basenames appearing in a build rule, but must also insert "-I" flags that list the appropriate set of snapshot directories a C compiler should search for snapshoted header files. This is processing that requires knowledge of a specific tool, in this case a C compiler. Every build rule step that invokes a C compiler must be found and expanded in a C compiler specific way, namely by the insertion of a list of header file directories to search. It is not difficult to see the general problem this might lead to. If a C compiler command line must be expanded in a C compiler specific way, a command line for some arbitrary tool X might need to be expanded in an X tool specific way. In this case the make-like took must also be modified to scan for and expand took X command lines appearing in our build rules, which is a difficult undertaking. Matters are made yet more complex when one considers that a program invoked by a build rule might need to invoke yet another program in order to do its job. If that other program must manipulate a dependency, the first program that invoked it must explicitly pass the complete expanded pathname of that dependency to the other program. Otherwise, the correct snapshoted version of that dependency will not be visible to the other program. This requirement must be noted as a convention, a convention that users must be made aware of and must diligently follow. Finally, if we manifest a snapshot by way of its complete pathname, and snapshots are read only, tools that see snapshots via this mechanism will not be able to modify them.

Variations of the fourth schema also suffers a number of disadvantages. All tools that might be used in build must be linked with a library providing alternate implementations for all I/O system calls but it is not always possible to do this. It should also be kept in mind that the tools relinked to this special library may be used by others for purposes other than building software. In such a context, outside of any build environment, it might be the case that those alternate system call implementations results in unacceptable performance problems, or fail with some strange error. Additionally, tools often come prelinked to the standard I/O library. The I/O system calls issued by these tools cannot therefore be intercepted.

Rather than rely on user level schemes to make snapshots visible, a more recent approach has been to implement special file systems that are specifically designed to make snapshots visible to tools in novel ways.

Examples include Sun Microystem's TPS, Bell Lab's 3-D file system and Atria's MVFS. These systems, though similar at a high level of abstraction, differ markedly in detail, largely due to the fact that each has been designed with a very different stipulated user community in mind.

At its simplest, a directory viewpath mechanism manifests an illusory patchwork directory that might be seen along some ordered list of specified directories, an ordered list that constitutes a "viewpath." All children of the foremost directory in that list are brought into view, as are all children of the second directory without named counterparts in the foremost directory, as are all children of the third directory without named counterparts in either the second or the first directory, and so on. If the viewpath mechanism happens to be implemented by a build file system, it is likely that all of the directories in that ordered list are themselves snapshots of a given directory, snapshots that represent revisions of that directory as it evolves over time.

Directory viewpath mechanisms come in a variety of forms. The more flexible the filesystem viewpath mechanism, the fewer restrictions need be place don the structure of the directories searched for snapshots. Of the three aforementioned file systems, TFS is likely the closest prior art. TFS comes packaged with Sun's Network Software Environment (NSE.) Within that environment, it is used to construct the directory trees that software developers do virtually all of their work in, from prebuild activities like source code editing to build activities like compiling and linking to post build activities like debugging. NSE's "activate" command is used to perform the TFS mounts needed to make a TFS directory visible. The snapshots made visible by TFS are found by way of an extremely simple viewpath mechanism that essentially manifests virtually all snapshots at mount time, rather than by way of a search on reference by snapshot name. In effect, TFS permits but a single mountpoint viewpath, statically defined by physically linking all of the physical directories appearing in that path. The n+1th physical directory appearing in the viewpath is specified by way of a textfile named "tfs_info" appearing in the nth physical directory of that same viewpath. The textfile itself is referred to as a "searchlink" and simply contains the pathname of the n+1th physical directory. The viewpath itself behaves in precisely the manner described above. Tools simply see the illusory patchwork directory along the set of physical directories making up the viewpath. Though not explicitly assigned one, each mountpoint subdirectory might be thought of as having its own viewpath as well, derived from the viewpath of its parent in a very simple manner, by appending the subdirectory name to the pathname of each directory appearing in the parent viewpath. Thus, the resulting TFS directory takes on the semblance of the directory that might logically be constructed by "layering" the searchlink connected viewpath directories, one over the other over the other, from the last directory in the viewpath to the first.

With this view in mind, TFS refers to each viewpath directory as a "layer," where each layer is to be thought of as a revision of the mounted TFS tree; a snapshot of its contents at some point in time. The first layer appearing in the viewpath is envisaged as the newest revision of the mounted directory, while the last layer is envisaged as the oldest. If multiple revisions of a file exist along the viewpath, the revisions appearing in the foremost layer is made manifest, while the remaining revisions are masked. The names appearing in the TFS directory thus consists of the union of the file names appearing along this single viewpath. If a tool attempts to reference a name that does not currently appear in a TFS directory, TFS will not dynamically search for and make manifest an appropriate revision with that name. It will simply report the name as nonexistent. Files in a common directory cannot be manifestations of revisions found by traversing two or more independent dynamically selected viewpaths. This makes it extremely difficult to make manifest "alternate" versions of files, versions that do not appear in any viewpath layer, but perhaps instead in a special set of directories that have been setup to revision alternate versions of those same files.

In TFS, only the first layer in the viewpath, referred to as the "front" layer, can actually be written to; all other directory layers are read only. From the tool point of view however, all manifested objects appear to be writable. If the manifestation of a revision appearing in some back layers (i.e. some layer other than the front layer) is made the target of a modification system call, TFS copies the revision to the front directory, and redirects that an all subsequent system calls to the resulting copy. If a TFS directory is asked to create a file, the file made manifest as a result of that request is in actually created within the front layer directory. Thus, the front layer contains all files that have been modified/created since mount time.

In general, it is assumed that all back layers in a viewpath are public shareable directories. A special command is used to create a user private front layer that points via search link to the first of these public back layers. Thus, each user can arbitrarily modify shared files made visible by virtue of this mechanism without concern. In all such cases, they are copied by TFS to the user's private front layer without her awareness. If these public back layers belong to two or more viewpaths at the same time, only the front layer of each such viewpath may differ, a back layer cannot be made to simultaneously point to two or more different following layers. Thus is a direct consequence of the fact that each such directory may contain but a single search link.

The 3-D file system introduces the notion of a "version file", where a version file is conceptually organized like a directory. Whenever a process references a 3-D version file by name, the file system selects and makes manifest a specific "instance" of that file conceptually contained within that directory, based on per-process information maintained in tabular form. Tools that are aware of the fact that they are manipulating a 3-D file may also explicitly select a specific instance of that file by tacking a "/X" to the end of that file's pathname, where X is the "name" of that specific instance (assigned at instance creation time). Unlike TFS, the 3-D file system thus provides file revisioning support for user-level version control systems.

Much like TFS, a 3-D directory might be assigned a single viewpath. Also, like TFS, each and every subdirectory possesses a viewpath implicitly derived from the viewpath of its parent, by appending the name of that subdirectory to the pathnames of each directory appearing in that parent viewpath. Unlike TFS however, these derived viewpaths can be overridden by explicit assignment. All explicitly viewpath assignments are specified in simple tabular form via a file that associates the pathname of a 3-D directory with the set of directories in its viewpath. The table can be set for a particular shell via a special shell command. Once set, the directories specified by that table will, for all intents and purposes, appear to be layered in the manner of TFS. Similarly, a table of slightly different form might be used to set instance mappings for version files, so that the correct instance of these files will be made manifest.

With MVFS, versioned data is stored in something Atria refers to as a network-accessible Versioned Object Base or VOB. A VOB is a simply a mountable file system. Like any other mountable file system, many VOBs can be mounted, as desired. A VOB will version files containing virtually anything (binaries, libraries, directories, text, etc). Unknown to the user, when appropriate, text files might be stored in delta or compressed formats in order to save disk space. A database manager associated with each VOB is used to maintain meta-data for every versioned object (referred to as an "element") within that VOB. Recorded meta-data might for instance note when an element was initially created. It also supports traditional checkin/checkout/branch creation/element deletion/compare/merge type facilities that might be applied to elements. Elements are made visible to UNIX tools when a VOB is first mounted. From the point of view of a standard UNIX tool, a mounted VOB appears to be no more than a standard UNIX directory tree, a directory tree filled with standard UNIX files, directories, and symbolic links, all of which the knowledgeable user knows to be MVFS element, versions. Thus, a VOB provides transparent tool access to element versions. Like 3-D however, the file system must make use of a special table in order to dynamically resolve tool element references a particular versions of those elements. In the case of MVFS, this table, referred to as a "configuration specification", contains a number of user-specified version selection rules that the file system tests on element reference. Once "set" by a user for a particular VOB, a configuration specification is said to present that user with a "view" of that VOB, simply because it determines what version of the VOB's elements that user will in fact see and work with. The collection of bound elements (bound in the sense of having been mapped to particular versions) is itself collectively referred to as a view "configuration", and might be modified by the developer at any time. Each selection rule, appearing within a given configuration specification, maps a qualifying expression of some kind (typically a wildcard expression) to a description of some version. When an element is referenced, the file system attempts to match the element name with the qualifying expression of each and every rule, from first rule to last. If the name matches (i.e. meets the criteria of) some qualifying expression, the element version that meets the criteria of the associated version description will be fetched by the file system. In the case of MVFS, the manifestations of elements are read-only. Thus, MFS transparently makes manifest files for build tools by way of a special file system.

As can be seen, while some of the prior-art file systems provide superior transparency, they still suffer from other restrictions. It would, therefore, be desirable to devise an improved mechanism for making the appropriate versions of files and/or directories transparently visible to users, and effectuating that transparency in such a way that the user may read, write, truncate, remove, rename, or otherwise modify them without modifying in any way the original (snapshot) files and directories made visible by that mechanism, but without the foregoing restrictions (e.g., preventing back layers from simultaneously pointing to two or more different following layers). It would be further advantageous if the mechanism requires no specialized knowledge on the part of the user to implement and provide for dynamic selection of the appropriate viewpath.

SUMMARY OF THE INVENTION

It is therefore one object of the present invention to provide a transparent file system allowing modification of snapshot objects, i.e., all system calls against a snapshot manifestation are permissible.

It is another object of the present invention to provide such a file system wherein every phase of a user operation is supported such that snapshots can be rendered visible regardless of whether they have been explicitly referenced by a tool.

It is yet another object of the present invention to provide a file system that allows more than one subdirectory-derivable viewpath to be associated with a given directory.

It is still another object of the present invention to allow more than a single viewpath to be traversed in order to find a particular snapshot.

The foregoing objects are achieved in a file system which creates a mountpoint directory, dynamically searches the computer system to find a requested file object, and manifests a representation of the requested file object in the mountpoint directory. If an earlier representation of the requested file object already exists (in the mountpoint directory), then any further requests for the file object are directed to the earlier representation. Searching can be performed along a viewpath having two or more independent search paths. In one implementation, three types of search paths are used: an alternate search path with a first set of directories based on an object name, an extension search path with a second set of directories based on an object name extension, and a library search path with a third set of directories used regardless of object name or object name extension. The alternate search path is searched first, followed by the extension search path, followed by the library search path. Manifestations of the file objects can be bound within the kernel (for UNIX systems) to speed up processing.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
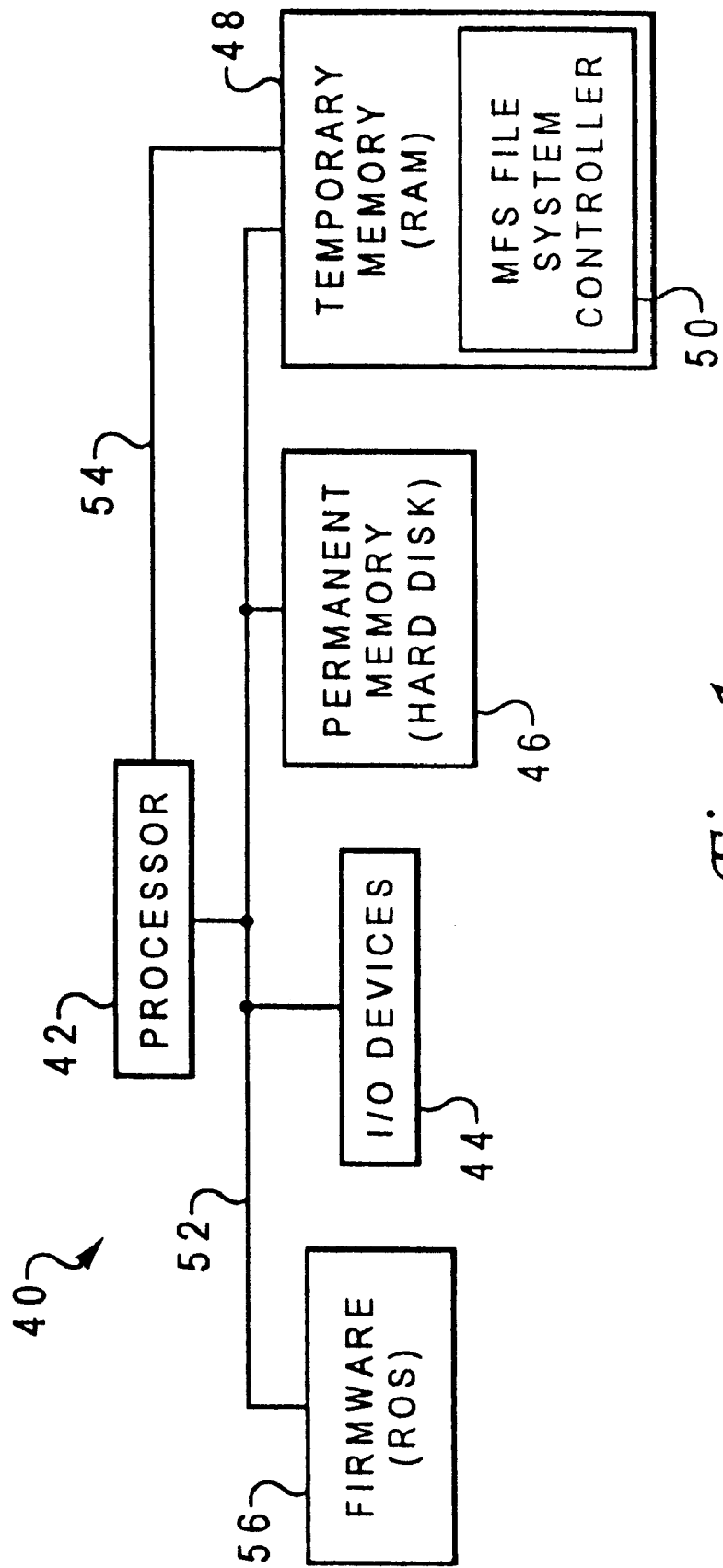
FIG. 1 is a block diagram of a computer system to which the present invention can be applied.

With the present invention, users of the OS file system need not be aware of which physical file system implements a logical file system object (e.g. a file, a directory, a symbolic link), and portions of the OS file system tree might be implemented by different physical file systems. The preferred embodiment also assumes that the file system implementation makes use of something referred to as the vnode architecture. The vnode architecture splits a file system implementation into two distinct layers: one layer of which implements all file system independent calls, herein referred to as the logical file system layers; the other of which consists of an extensible set of one or more physical file systems, herein referred to as the physical file system layer. The interface between the logical file system layer and the physical file system layer is referred to as the vnode interface.

When processes make system call to read, write, open, close, etc., the files and assorted other UNIX file system objects appearing in a UNIX file system tree, they generally do so without knowledge of which physical file system actually implements those objects. Processes are not provided with a unique system call interface for each physical file system, rather they are provided with a single generic system call interface that operates on generic UNIX file system objects. The complete set of UNIX file system calls, along with the generic file system tree, are implemented by the logical file system layer.

A given physical file system may be used to implement zero or more of the subtrees appearing in the abstract logical file system tree. Each such subtree is said to be a "mounted" instance of that physical file system. The root of each such subtree is referred to as a mountpoint. Each physical file system provides a routine that may be called to "mount" a new "instance" of that physical file system over any directory currently appearing in the abstract directory tree.

A file system object appearing in the generic UNIX file system tree is represented in the kernel by a data structure known as a vnode. Each vnode possesses:

1) a set of fields that are managed by the logical UNIX file system layer,
2) a pointer to a state data cache that is defined, initialized, and manipulated by the physical file system that created the vnode, and
3) a pointer to a vnode ops table initialized by the aforementioned physical file system.

Each entry of the vnode ops table contains the address of the physical file system implementation for a function that operates on that vnode. Each such function implements one of the standard vnode interface routines. As a consequence the UNIX file system layer might "ask" a vnode to perform a particular vnode operation on itself by passing that vnode, along with zero or more additional parameters, to the address specified vnode ops table function that actually implements that operation. No knowledge of which physical file system actually implements the vnode is required in order to make the call. For example, presuming that an open( ) system call has been issued against some file A, and that the logical file system is in possession of the vnode representing file A, the logical file system might transparently "ask" file A to open( ) itself by:

1) obtaining the address of the vnode ops table from A's vnode,
2) obtaining the address of the physical file system's vnode open( ) implementation from the vnode ops table, and 3) passing that vnode, along with any other necessary arguments, to the address specified vnode open( ) implementation.

In order to carry out this operation, the logical file system layer required no knowledge of which physical file system actually implements the vnode. It is this structure that makes the file system extensible. Any new physical file system might be added to the file system repertoire without modification of the logical file system layer. Because this architecture is in essence "object oriented," this invention might be implemented on any OS supporting a similar "object oriented" architecture that splits the file system implementation into a logical file system layer and a physical file system layer.

The present invention is directed to a mountable UNIX file system that conforms to vnode conventions, referred to herein as the mirage file system, or MFS. Referring to FIG. 1, the present invention may be implemented on a computer system 40 having a central processing unit (CPU) or processor 42 which is connected to several peripheral devices. The peripheral devices include input/output (I/O) devices 44 (such as a display monitor and keyboard) for the user interface, a permanent memory device 46 (such as a hard disk or floppy diskette) for storing the computer's operating system and user programs, and a temporary memory device 48 (such as random-access memory or RAM) that is used by processor 42 to carry out program instructions. Programs and data can be transferred between temporary memory 48 and permanent memory 46 as needed. RAM 48 also stores the MFS file system controller 50, i.e., the program code necessary to create and manage the MFS file system. Processor 42 communicates with the peripheral devices by various means, including a bus 52 or a direct channel 54. Computer system 40 also includes firmware 53 (such as read-only storage or ROS) whose primary purpose is to seek out and load an operating system from one of the peripherals (usually permanent memory device 46) whenever the computer is first turned on. Those skilled in the art will appreciate that there may be other components which are not shown, such as controllers or adapters, so the exemplary construction shown in FIG. 1 should not be construed in a limiting sense.

Figure 2:
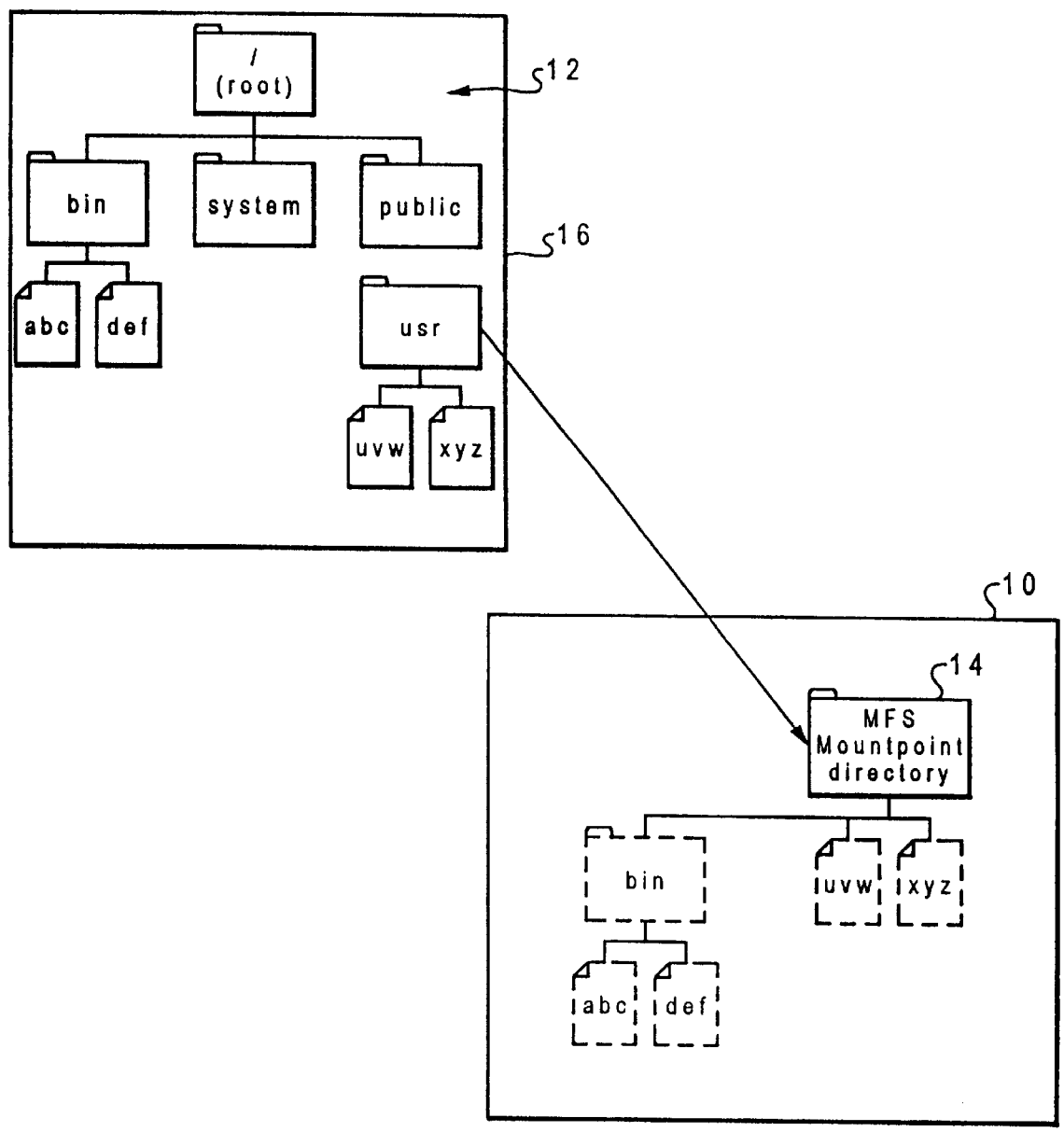
FIG. 2 is a block diagram depicting creation of a novel mirage file system based on intermediate (vnode) structures corresponding to objects in an existing directory tree.

With reference to FIG. 2, at any given time, an instance 10 of the MFS file system may be mounted over any existing directory 12 appearing in a machine's UNIX directory tree. Once mounted, that directory 10 and all of its future children are implemented by way of the MFS file system. An MFS directory tree, unlike other directory trees, may be thought of as a composite, wherein each directory, symbolic link, or regular file is, in actuality, a mirage of some corresponding object in some existing directory tree implemented by some file system other than an MFS file system. An MFS mountpoint directory 14 begins life without branches of any kind, completely empty. As compilers, linkers, loaders, stream editors, etc., issue UNIX system calls to open, stat, access, or otherwise look up by name some object under an MFS directory, the MFS file system dynamically searches the directory trees of other file systems, looking for an appropriate object with that name. More specifically, the vnodes within the kernel 16 are searched. If an appropriate object is found, the MFS file system makes it appear as though that object actually resides in the MFS directory asked to do the look up in the first place. Thus, while tools issuing these system calls see what appear to be standard UNIX files, directories, and/or symbolic links, they are, in fact, illusions of objects dynamically found in other file systems.

Like all MFS directories, the mountpoint directory is itself a mirage of a special directory referred to as the process cell. If compilers, linkers, loaders, or other miscellaneous tools issue system calls to make a directory, create a file, or otherwise generate some object beneath an MFS directory, the MFS file system creates that object in the process cell directory and realizes a mirage of it under the MFS directory originally asked to create it, a mirage that is again, from the point of view of the requesting tool, indistinguishable from the object created under the process cell. With the MFS file system, build tools no longer need to statically construct working directories filled in one way or another with the source, include, object, or other multifarious file system objects that might be processed by the compilers, linkers, loaders, etc., that actually execute within those directories. Instead, build tools can set up MFS working directories that transparently effectuate these tasks on demand.

The directories that the MFS file system searches for looked-up objects are specified by way of one or more search-path rules appearing in a text file that is fed to the system at directory mount time (the MFS "search" file). When an MFS directory is indirectly asked via system call to look up some object by name, simple name-pattern matching rules are used to select one or more rules from this file and traverse the set of non-MFS directories defined by them. What particularly differentiates the MFS file system from prior-art file systems is its unique viewpath mechanism for finding and making visible file system objects scattered amongst the directory trees of other file systems. Look-up requests are made of a given MFS directory when a pathname is passed to a system call. Before the routine implementing any such system call can manipulate the object referred to by the passed pathname, the UNIX logical file system must find that object for that routine. Given a directory D, it can ask that directory to look up (i.e., return) any child object it might have with a particular name. If directory D has an object with that name, and it turns out to be a directory, the logical file system can, in turn, ask that object to return any child object it might have with a particular name. Given that it has in its possession the root directory of the logical file system tree ("/"), and the current working directory ("."), it can repeatedly apply the aforementioned procedure in order to find the object referred to by any pathname. If, for example, it has passed the relative pathname a/b/c, it might find c by asking the current working directory to return the object with name "a". If the current working directory has a child with that name and it turns out to be a directory, the logical file system may, in turn, ask that directory for the object with name "b," and If an object with that name exists and it turns out to be a directory, it, in turn, may be asked to look up the object with name "c."

If an MFS directory is asked to look up a named child, a special name resolution mechanism is invoked to find an appropriate non-MFS object with this name in some other file system and realize a child mirage that is bound to it. If, for example, an MFS mountpoint directory has a pathname "/afs/rchland.ibm.com/user2/lmfsmount," it might be indirectly asked to look up the subdirectory with name "splash.C" via the system call stat( "/afs/rchland.ibm.com/user2/mfsmount/splash.C"). The aforementioned mechanism is then invoked in order to find some non-MFS object with that name. If such an object is found, say a JFS file "/usr/src/splash.C", a file mirage with name splash.C is dynamically realized under the MFS directory and is bound to /usr/src/splash.C. Thus, in the MFS file system, a file, directory, or symbolic link might instantly appear on reference. This mechanism is invoked if and only if a mirage for the named object does not already exist beneath the MFS directory receiving the look-up request. If a mirage with a specified name already exists, the directory simply returns that mirage as is, and no extra overhead is incurred. If no objects are found by way of directory search path traversals, the MFS directory asked to do the look-up in the first place simply tells the calling program that no object with that name exists in the directory.

If an MFS directory mirage is forced to execute a search in order to resolve a name look-up request, it first looks for an object with that name in the process cell directory that the mirage is bound to. For example, if the MFS mountpoint directory is asked to look up the name "foobar," it first looks for "foobar" in the root directory of the process cell tree (i.e., the directory that the mountpoint mirage is bound to), because generated and/or versioned objects are stored there. If multiple instances of MFS file systems executing on multiple machines share the same process cell directory (assuming that the process cell directory is implemented by a distributed file system like AFS), objects generated by tools running under one mountpoint on one machine may be found by tools running under the other mountpoint via this shared process cell. If an object with the specified name cannot be found in the process cell, and one or more search paths have been assigned to the queried directory, the MFS file system traverses those search paths, looking for an object with that name. A search path is simply an ordered list of directories. In an exemplary implementation, four search-path types are used: regular expression paths, alternate search paths, extension search paths, and library search paths. An MFS directory is assigned any number of alternate search paths, any number of extension search paths, and exactly one library search path.

A regular expression path is a search path (i.e., a set of directories) also created with a given regular expression and directory. A given name is matched by a regular expression path if the name is matched by the associated regular expression.

An alternate search path is a search path associated with a particular name. For example, if the search path P0, P1, . . . PN is associated with the name "foobar," that search path is said to be an alternate search path. If the MFS file system is asked to look up a name, and it resorts to search path traversals in order to find an object with that name, it might traverse, at most, one alternate search path in order to find that object, namely any alternate search path associated with that name. In the previous example, the alternate search path associated with the name "foobar" might be traversed if the directory possessing that search path is asked to look up "foobar."

An extension search path is a search path associated with a particular file extension. For example, if the search path P0, P1, . . . PN is associated with the extension ".h" (precompiled header files), that search path is said to be an extension search path. If the MFS file system is asked to look up a name, and it must resort to search path traversals in order to find an object with that name, it might traverse at most one extension search path in order to find that object, namely any extension search path associated with that particular extension. In this example, the search path associated with the extension ".h" might be traversed if the directory possessing that search path is asked to look up "x.h".

The library search path is basically the search path of last resort. If all other search paths have been traversed without success, the library search path is traversed. Other implementations could have more or less than these four search-path types, whose characteristics vary according to the particular operating system.

Search paths can be traversed in different orders. In an exemplary implementation, if a directory has been asked to look up a particular name and it possesses an alternate search path associated with that name, that alternate search path is traversed first. If the name matches a regular expression of the associated regular expression path, then that search path is traversed next. If that name has an extension and the directory possesses an extension search path for that particular extension, that search path is traversed next. The library search path is traversed last. Each declaration appearing in the search file specifies either a search path to be constructed for the MFS mountpoint directory at mount time, or a search path override for a relative path-identified mountpoint subdirectory that might eventually be realized.

Each directory mirage appearing in an MFS directory tree has its own set of search paths. If no search paths have been explicitly assigned to a directory, they can be created and assigned to it when that directory is first created. If an MFS directory ID is asked to create a child directory X, for each search path owned by directory D, the MFS file system will create a corresponding directory X search path. If the directory with pathname P constitutes the nth real directory in a given directory ID search path, the directory with pathname P/X will constitute the nth directory in the corresponding directory X search path. If, for example, directory D happens to possess an extension search path for ".h " extensions of "/afs/rchland.ibm.com/user2/funky, /foobar" then the newly realized subdirectory X will be assigned the .h extension search path "/X, /afs/rchland.ibm.com/user2/funky/X, /foobar/X." After subdirectory X has been realized, this inherited search path may be used by subdirectory X to resolve name look-up requests for ".h" files.

This viewpath mechanism differentiates the MFS file system from prior-art file systems in a number of respects, namely: (1) more than one independent, or subdirectory-derivable, viewpath ("search path") can be associated with a given directory, meaning a viewpath can be associated with any number of explicit names (alternate search paths) or extensions (extension search paths) and, additionally, a single default viewpath (library search path) can be associated with the directory; (2) the viewpath(s) actually used to find a snapshot are dynamically selected by pattern match on reference by name; and (3) more than a single viewpath might be traversed to find a snapshot, in order of viewpath type, such that any viewpath associated with a name identical to that of the snapshot name is traversed first, any viewpath associated with a name extension identical to that of the snapshot's name extension is traversed next, and if the snapshot is not found by way of either of the aforementioned traversals, then the directory's default viewpath can be traversed. Prior-art file systems are thus severely constrained when compared to the present invention.

Figure 3:
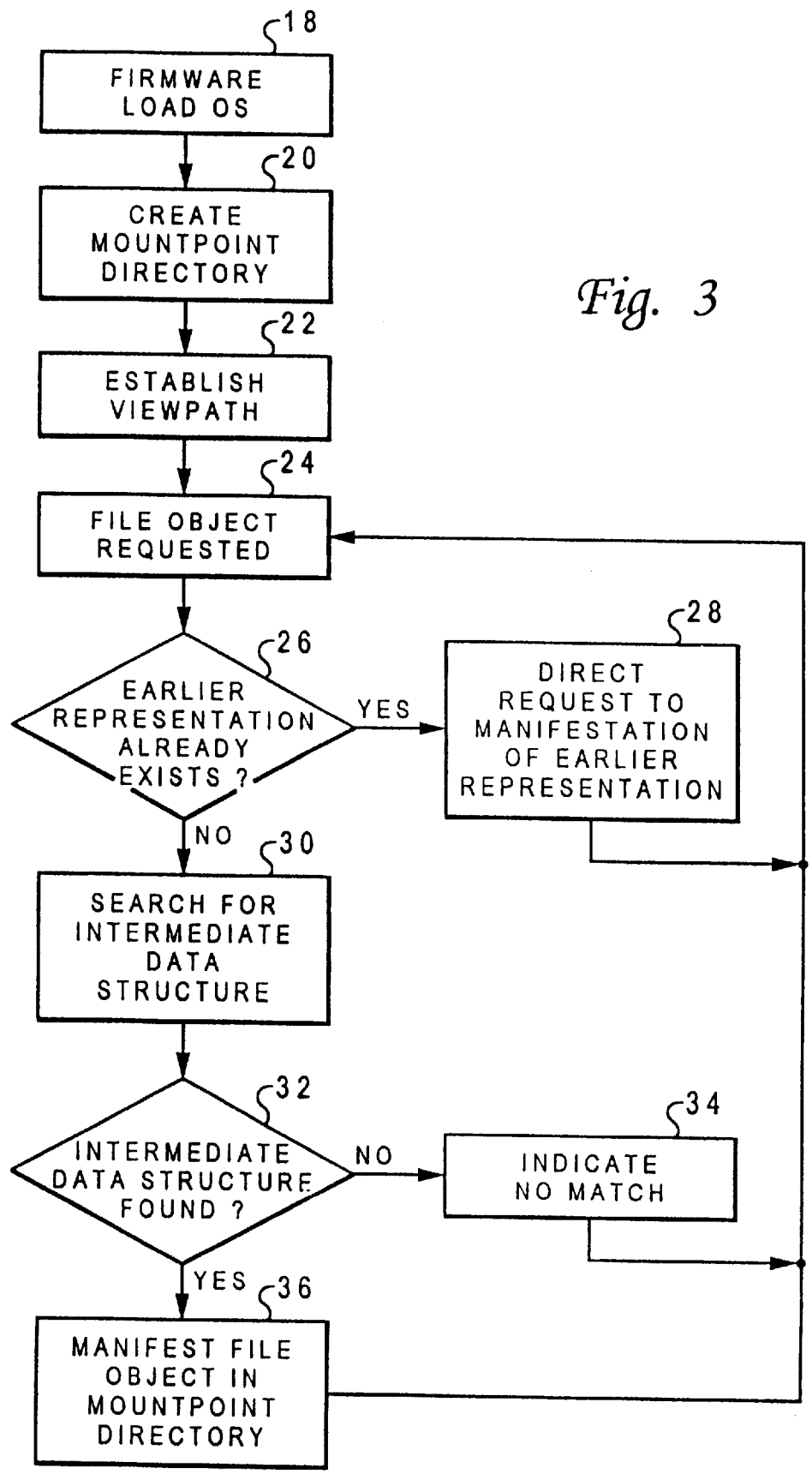
FIG. 3 is a flow chart depicting creation of the mountpoint directory and manifesting requested file objects in that directory, according to the present invention.

The present invention may be further understood with reference to the flow chart of FIG 3. After the computer operating system is loaded by the firmware (18), the MFS mountpoint directory is created (20). A viewpath is established using the aforementioned text file having name-pattern matching rules (22). When a file object is thereafter requested (24), the MFS file system first checks to see if a representation of the requested file object already exists (26), i.e., was earlier manifested. If so, the request is directed to the earlier manifestation (28). if not, the MFS file system controller searches for an intermediate data structure corresponding to the requested object (30), according to the rules in the text file establishing the view path. The file system examines the results of the search to determine if the requested file object was found (32) and, if not, indicates that no match was found (34). If a match is found, the object is manifested in the mountpoint directory (36), i.e., the representation is bound to the data structure in the kernel. This procedure is repeated for each requested file object.

Figure 4A:
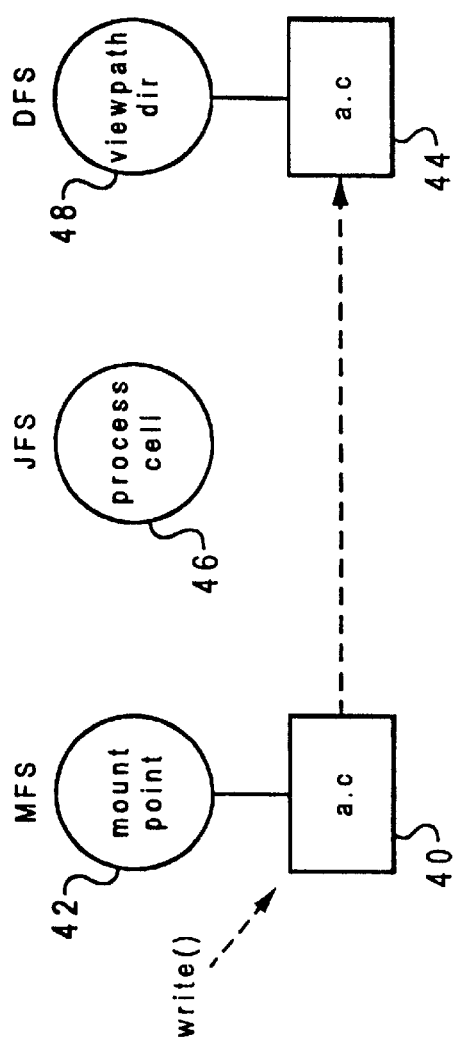
FIGS. 4A and 4B are block diagrams illustrating creation of a file system object in a process cell in response to a request to modify a mirage object.
Figure 4B:
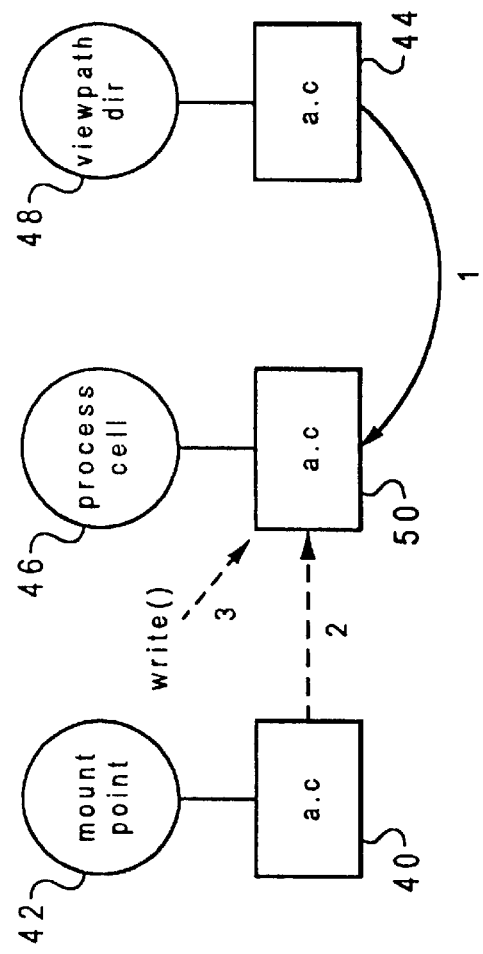

All MFS objects are modifiable. If a modification request is issued against the mirage of a non-process cell object, that object is copied to the process cell, the mirage rebound to that copy, and the copy modified. All subsequent I/O calls issued against that mirage are redirected to the process cell copy. Thus, MFS makes all mirages modifiable without modifying in anyway the objects of which those mirages are manifestations. An example is shown in FIGS. 4A and 4B in which a "write( )" call is issued against a mirage 40 in a mount point directory 42. Because mirage 40 is a manifestation of a snapshot 44 (named "a.c") that is currently not in the process cell 46, MFS (1) copies "a.c" from the viewpath directory 48 to process cell 46, (2) rebinds mirage 40 to the process cell copy 50, and (3) reissues the "write( )" call against copy 50. The process cell and set of viewpaths may belong the any file system other than MFS (such as JFS or DFS).

One particular example of how the present invention may be implemented is to use file naming conventions to partition snapshot directories. Object files (".o" extensions) can appear in different snapshot directories from ASCII files (".a" extensions), which can appear in different snapshot directories from source code files (".c" extensions). If exceptions were to occur, overrides, alternate search paths, and/or prebound mirages may be used to resolve them. The MFS file system makes it easy to realize, in one mirage directory, objects from real directories which are partitioned in this manner. A unique naming convention can optionally be used to identify files of a particular project, such as by prefixing all MFS files with the prefix "mfs__". A viewpath associated with the expression "mfs__*.c" might then be used to find all MFS source code (C) files in a particular set of MFS project-specific directories.

Figure 5:
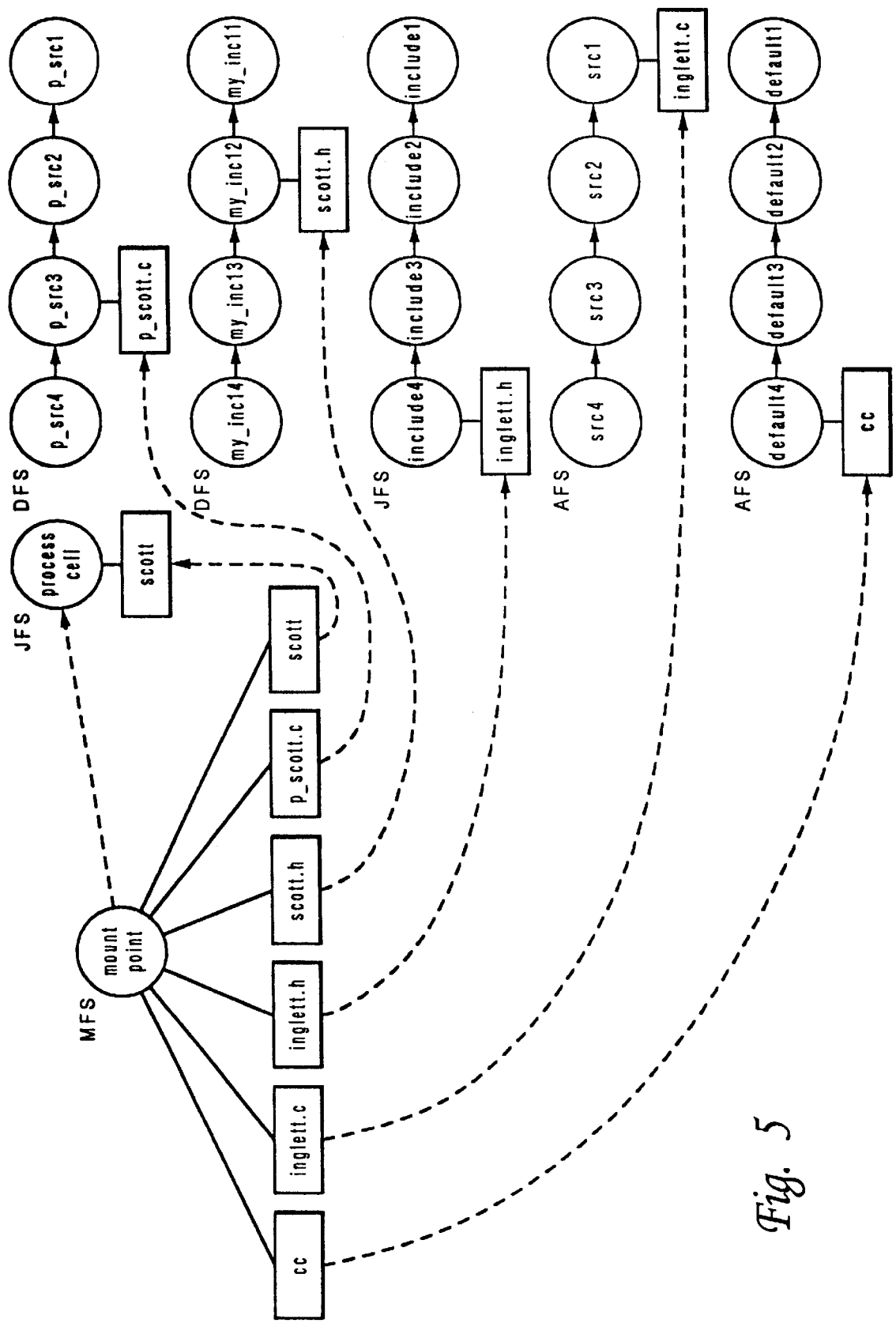
FIG. 5 is a block diagram illustrating the use of various viewpaths to execute a command in a mountpoint directory.

A further example which illustrates the flexibility of the present invention and the use of partitioning is shown in FIG. 5. At mount time, the mountpoint directory is assigned the following viewpaths:

| Type | Criteria | Viewpath |
| --- | --- | --- |
| alternate | "scott.h" | "my_incl4, my_incl3, my_incl 2, my_incl1" |
| regular expression | "p_*.c" | "p_src4, p_src3, p_src2, p_src1" |
| extension | ".h" | "src4, src3, src2, src1" |
| library (default) | n/a | "default4, default3, default2, default1" |

At mount time, the mountpoint directory assigned these viewpaths is empty. FIG. 5 depicts the set of mirages created beneath the mountpoint after the command "cc scott p_scott.c inglett.c" has been executed within the mountpoint. The first file "cc" (the C compiler itself) is found within the default viewpath because its name has no extension. the file "inglett.c" is found within the ".c" extension viewpath; this file in turn refers to the header file "inglett.h" which is found within the public ".h" extension viewpath. The file "p_scott.c" is found within the "p_*.c" regular expression viewpath. Assuming that "p_" is some project mnemonic, the regular expression viewpath is used to find all ".c" files that belong to project "p." That file in turn refers to the header file "scott.h" which is found within the "scott.h" alternate viewpath rather than the ".h" extension viewpath. This specific viewpath may be provided to use some special (private) version of that file rather then a public copy appearing in the ".h" extension viewpath. The compiler output file "scott" is created in the process cell, and a mirage of that file is made to appear beneath the mountpoint directory. The viewpaths in FIG. 5 also span multiple file system (AFS, DFS, JFS).

One advantage of the novel file system described herein is the ability to make nondependency snapshots visible, so the user is not required to declare them explicitly. Another advantage is that it avoids the need to provide alternate libraries for system calls at the user level, which can require pre-linking tools. The MFS file system implements all operations that might be issued against the snapshots that it makes visible, so it can record all operations carried out against the snapshot manifestations. Finally, the MFS system minimizes the overhead required to establish mountpoints across different machines. System calls issued against prebound mirages are always satisfied in less time than it takes to satisfy the same call against an equivalent symbolic link. Speed gains are even greater if symbolic links are part of symbolic link chains, as long as the time required to create the prebound mirages from a binding file does not exceed the total time saved by making system calls against prebound mirages rather than symbolic links. In order to keep this overhead low, the binding file translation is done entirely within the kernel.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention should not be construed as being limited to UNIX platforms, since other operating systems and file/directory conventions can be applied to the file system presented herein. It is therefore contemplated that such modifications can be made without departing from the spirit or scope of the present invention as defined in the appended claims.

I claim:

1. A file system for a computer having a device for storing data and an operating system for organizing the data into logical file system objects including files and directories, the operating system interacting with the file objects by means of intermediate data structures, the file system comprising:

means for creating a mountpoint directory over an existing directory of the file system;

means for dynamically searching said intermediate data structures to find a requested logical file system object; and means for manifesting a representation of the requested logical file system object in said mountpoint directory as a separate logical file system object.

2. The file system of claim 1 wherein said dynamic searching means is responsive to calls from the operating system against the requested logical file system object.

3. The file system of claim 2 wherein said dynamic searching means is further responsive to said calls which specify the requested logical file system object as being located in said mountpoint directory.

4. The file system of claim 1 wherein said dynamic searching means first searches said mountpoint directory to determine whether an earlier representation of the requested logical file system object already exists and, if so, directing any further requests for the requested logical file system object to said earlier representation.

5. The file system of claim 4 wherein, if no earlier representation of the requested logical file system object is found in said mountpoint directory, said dynamic searching means thereafter searches for the requested logical file system object along a viewpath comprising one or more independent search paths.

6. The file system of claim 1 further comprising means for indicating when no logical file system object is found matching the requested logical file system object.

7. The file system of claim 1 wherein said dynamic searching means searches for the requested logical file system object along a viewpath comprising at least two independent search paths.

8. The file system of claim 7 further comprising:

means for generating a child directory within said mountpoint directory; and means for creating child directory search paths corresponding to said independent search paths.

9. The file system of claim 7 wherein there are at least four of said independent search paths each of a different search-path type including:

a regular expression search path instructing said dynamic searching means to search a first set of directories for the requested logical file system object based on a regular expression;

an alternate search path instructing said dynamic searching means to search a second set of directories for the requested logical file system object based on an object name;

an extension search path instructing said dynamic searching means to search a third set of directories for the requested logical file system object based on an object name extension; and a library search path instructing said dynamic searching means to search a fourth set of directories for the requested logical file system object without regard to said regular expression, said object name or said object name extension.

10. The file system of claim 9 wherein said dynamic searching means searches said second set of directories before searching said first, third or fourth sets of directories, and further searches said first set of directories before searching said third or fourth sets of directories.

11. The file system of claim 1 wherein the operating system supports more than one physical file system each physical file system having physical file system objects corresponding to the logical file system objects.

12. The file system of claim 11 wherein the operating system calls a physical file system routine to implement an input/output call issued against a given logical file system object, and said searching means makes use of said physical file system routine to locate a physical file system object corresponding to said requested logical file system object.

13. The file system of claim 1 wherein:

said operating system has a kernel for low-level, fast operations; and said manifesting means binds the representation of the requested logical file system object to its corresponding data structure within the kernel.

14. A method of manifesting a representation of a requested file object in a computer system, the file object residing in a storage device and having a corresponding intermediate data structure which is used to access the file object, comprising the steps of:

creating a mountpoint directory over an existing directory of the computer system;

searching the computer system for the intermediate data structure; and if the intermediate data structure is found, associating the intermediate data structure with a representation of the requested file as a separate logical file system object but, if the intermediate data structure is not found, indicating that the requested file object does not exist.

15. The method of claim 14 wherein said searching step is performed in response to a call from the computer system against the requested file object.

16. The method of claim 14 comprising the additional step of searching said mountpoint directory to determine whether an earlier representation of the requested file object already exists before said searching of the computer system for the intermediate data structure.

17. The method of claim 16 wherein, if no earlier representation of the requested file object is found in said mountpoint directory, said searching step includes thereafter searching for the requested file object along a viewpath comprising one or more search paths.

18. The method of claim 17 wherein:

there are at least four of said independent search paths each of a different search-path type including a regular expression search path instructing said dynamic searching means to search a first set of directories for the requested logical file system object based on a regular expression, an alternate search path instructing said dynamic searching means to search a second set of directories for the requested logical file system object based on an object name, an extension search path instructing said dynamic searching means to search a third set of directories for the requested logical file system object based on an object name extension, and a library search path instructing said dynamic searching means to search a fourth set of directories for the requested logical file system object without regard to said regular expression, said object name or said object name extension; and said searching step first searches said second set of directories, then searches said first set of directories only if the requested logical file system object is not found in the second set of directories, then searches said third set of directories only if the requested file object is not found in the first or second sets of directories, and thereafter searches said fourth set of directories only if the requested file object is not found in the first, second or third sets of directories.

19. The method of claim 14 wherein said searching step searches for the requested file object along a viewpath comprising at least two independent search paths.

20. The method of claim 14 wherein:

said computer system has a kernel for low-level, fast operations; and said associating step binds the representation of the requested file object to its corresponding data structure within the kernel.

21. A file system for a computer having access to a device for storing data and an operating system that logically organizes the data into logical file system (LFS) objects, the file system comprising:

means for calling one or more physical file system routines to implement input/output system calls issued against a given LFS object;

means for using one of the physical file system routines to locate a given PFS object beneath a given directory;

means for supporting at least one physical file system which implements the LFS objects by way of corresponding physical file system (PFS) objects;

means for using one of the physical file system routines to mount an instance of the physical file system over a given directory, the contents of which are subsequently implemented by the physical file system;

means for assigning a set of viewpaths to a mountpoint directory; and means for searching one more of the viewpaths of a given directory for the given LFS object and, if found, manifesting a mirage object associated with the given LFS object in the given directory.

22. The file system of claim 21 wherein said manifesting means manifests the mirage object by creating a second LFS object corresponding to a second PFS object.

23. The file system of claim 22 further comprising means for redirecting operating system calls against the given PFS object to the second PFS object.

24. The file system of claim 21 wherein said mounting means includes means for creating a child directory beneath the mountpoint directory, the child directory inheriting the set of viewpaths.

* * * * *